United States Patent
Liu et al.

(10) Patent No.: US 12,211,258 B2
(45) Date of Patent: Jan. 28, 2025

(54) AUTOMATIC MODELING METHOD AND DEVICE FOR OBJECT DETECTION MODEL

(71) Applicant: INSPUR SUZHOU INTELLIGENT TECHNOLOGY CO., LTD., Jiangsu (CN)

(72) Inventors: Hongli Liu, Jiangsu (CN); Feng Li, Jiangsu (CN); Xin Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 373 days.

(21) Appl. No.: 17/642,816

(22) PCT Filed: Dec. 30, 2019

(86) PCT No.: PCT/CN2019/130024
§ 371 (c)(1),
(2) Date: Mar. 14, 2022

(87) PCT Pub. No.: WO2021/056914
PCT Pub. Date: Apr. 1, 2021

(65) Prior Publication Data
US 2022/0383627 A1    Dec. 1, 2022

(30) Foreign Application Priority Data
Sep. 25, 2019   (CN) .......................... 201910912868.1

(51) Int. Cl.
*G06V 10/82* (2022.01)
*G06N 3/04* (2023.01)
(Continued)

(52) U.S. Cl.
CPC .............. *G06V 10/82* (2022.01); *G06N 3/04* (2013.01); *G06N 20/20* (2019.01); *G06V 10/776* (2022.01)

(58) Field of Classification Search
CPC ...... G06V 10/82; G06V 10/776; G06V 10/40; G06V 2201/07; G06V 10/454; G06N 3/04;
(Continued)

(56) References Cited

U.S. PATENT DOCUMENTS

| 2012/0119987 A1 | 5/2012 | Im et al. |
| 2019/0026639 A1* | 1/2019 | Vasudevan ............ G06T 7/0002 |

(Continued)

FOREIGN PATENT DOCUMENTS

| CN | 107886117 A | 4/2018 |
| CN | 109063759 A | 12/2018 |

(Continued)

OTHER PUBLICATIONS

International Search Report and English Translation cited in PCT/CN2019/130024 mailed Jun. 28, 2020, 5 pages.
(Continued)

*Primary Examiner* — Wesley J Tucker
*Assistant Examiner* — Han Hoang
(74) *Attorney, Agent, or Firm* — Cooper Legal Group, LLC (57) ABSTRACT

An automatic modeling method for object detection model, the method includes: S1, searching for an NAS network model according to a predetermined first neural network; S2, training a first object detection model by using a training set, evaluating the current first object detection model by using a validation set after a number of training times reaches a first preset number of times, and outputting an evaluation result, wherein the first object detection model is a model obtained by detection part fusion of the NAS network model and a second object detection model; S3, calculating a reward corresponding to the current first object detection model; S4, adjusting parameters used for searching for the
(Continued)

NAS network model according to the reward: repeating the steps S1-S4 for a second preset number of times, and determining an optimal first object detection model according to the evaluation result. Further disclosed in the present invention is an automatic modeling device. The method and device provided by the present invention can search for different models according to different tasks, and improve an object detection effect.

14 Claims, 5 Drawing Sheets

(51) Int. Cl.
    *G06N 20/20*     (2019.01)
    *G06V 10/776*     (2022.01)

(58) Field of Classification Search
    CPC ...... G06N 20/20; G06N 3/048; G06N 3/0464; G06N 3/09; G06N 3/045; G06N 3/0985; G06N 3/044; G06N 3/084; G06N 3/092; Y02T 10/40
    See application file for complete search history.

(56) References Cited

U.S. PATENT DOCUMENTS

| | | | | |
|---|---|---|---|---|
| 2019/0392351 | A1* | 12/2019 | Zuluaga | G06N 20/20 |
| 2020/0034627 | A1* | 1/2020 | Zhu | G06F 18/217 |

FOREIGN PATENT DOCUMENTS

| | | |
|---|---|---|
| CN | 109325454 A | 2/2019 |
| CN | 109788222 A | 5/2019 |
| JP | 2018190332 A | 11/2018 |
| JP | 2020522035 A | 7/2020 |
| JP | 2021501417 A | 1/2021 |
| WO | 2019084560 A1 | 5/2019 |

OTHER PUBLICATIONS

Written Opinion and English Translation cited in PCT/CN2019/130024 mailed Jun. 28, 2020, 7 pages.
"The University of Tsukuba and Yokokuni Neural network automatic design technology architecture search also takes only 2 and a half hours on a PC", Nikkei Robotics, Sep. 2019, pp. 16-21.
Tan, Mingxing, et al., "MnasNet: Platform-Aware Neural Architecture Search for Mobile", May 29, 2019, pp. 1-9.
Wang, Ning, "NAS-FCOS: Fast Neural Architecture Search for Object Detection", School of Computer Science, Sep. 7, 2019, pp. 1-9, arxiv.org.
Chen, Yukang, et al., "DetNAS: Backbone Search for Object Detection", National Laboratory of Pattern Recognition, Institute of Automation, Chinese Academy of Sciences, Megvii Technology, Jun. 10, 2019, pp. 1-11, arxiv.org.
Chen, Yukang, et al., "RENAS: Reinforced Evolutionary Neural Architecture Search", 2019 IEEE/CVF Conference on Computer Vision and Patter Recognition (CVPR), pp. 1-11, Mar. 26, 2019.
Zoph, Barret, et al., "Neural Architecture Search with Reinforcement Learning", Google.com, Feb. 15, 2017, pp. 1-16, arxiv.org.
Corresponding Japanese Patent Application No. 2022-517307, Decision to Grant a Patent dated Jul. 14, 2023.
Corresponding Japanese Patent Application No. 2022-517307, Notice of Reasons for Refusal dated Mar. 15, 2023.
Corresponding Japanese Patent Application No. 2022-517307, Search Report dated Mar. 2, 2023.
Tian, Zhi, et al., "FCOS: Fully Convolutional One-Stage Object Detection", Aug. 2, 2019, pp. 1-13, arxiv.org.
Corresponding European Patent Application No. 19946971.9, Communication pursuant to Article 94(3) EPC dated Jul. 1, 2024.
Corresponding European Patent Application No. 19946971.9, Extended European Search Report dated Sep. 18, 2023.

* cited by examiner

AUTOMATIC MODELING METHOD AND DEVICE FOR OBJECT DETECTION MODEL

CROSS-REFERENCE TO RELATED APPLICATIONS

The present application claims priority to Chinese patent application No. 201910912868.1 filed with the Chinese Patent Office on Sep. 25, 2019, entitled "Automatic Modeling Method and Device for Object Detection Model", the entire contents of which are incorporated by reference in the present application.

TECHNICAL FIELD

The present invention relates to the field of object detection, and in particular to an automatic modeling method and device in the field of object detection.

BACKGROUND ART

Object detection, as a classical topic in the field of image processing and computer vision, has a wide range of applications in traffic monitoring, image retrieval, human-computer interaction, etc. It aims to detect the target object of interest in a still image (or dynamic video). At present, the more popular algorithms include Yolo, SSD, and R-CNN algorithms. However, existing object detection algorithms use fixed network structure to extract image features, and cannot use different network structures to extract the most suitable image features according to different tasks and data characteristics, which makes the artificially designed object detection model can only achieve higher accuracy for specific tasks and lacks flexibility.

SUMMARY OF THE INVENTION

The technical problem to be solved by the present invention is to provide an automatic modeling method for object detection model, which can search for different models according to different tasks and improve the effect of object detection.

To solve the above technical problems, embodiments of the present invention provide an automatic modeling method for object detection model, which includes the following steps:

S1, searching for a Neural Architecture Search (NAS) network model according to a predetermined first neural network;

S2, training a first object detection model by using a training set, evaluating the current first object detection model by using a validation set after a number of training times reaches a first preset number of times, and outputting an evaluation result, wherein the first object detection model is a model obtained by detection part. fusion of the NAS network model and a second object detection model;

S3, calculating an object detection task reward corresponding to the current first object detection model; and S4, adjusting parameters used for searching for the NAS network model according to the object detection task reward; and repeating the steps S1-S4 for a second preset number of times, and determining an optimal first object detection model according to the evaluation result.

Preferably, the first neural network is a Recurrent Neural Network (RNN).

Step S1 includes:

step S11, sampling through a RNN controller according to preconfigured hyperparameters, to obtain a subnetwork structure encoding; wherein said hyperparameters include subnetwork hyperparameters, controller hyperparameters; the subnetwork. hyperparameters include the number of layers of the subnetwork, the number of cell branches, parameters related to the learning rate of the subnetwork, and the number of output channels; the controller hyperparameters include parameters related to the learning rate of the controller, and optimizer configuration parameters; and step S12: outputting the NAS network model by decoding the subnetwork structure encoding through a decoder.

Preferably, the NAS network model is a NAS network without a fully connected layer.

The detection part fusion of the NAS network and the first object detection model refers to:

that a plurality of output ends of different scales of the NAS network model are each connected to a 1*1 convolutional layer, and an output of the 1*1 convolutional layer is used as an input of a detection part of the second object detection model.

Preferably, after determining the optimal first object detection model according to the evaluation result the method includes:

training the first object detection model with optimal evaluation result by using a training set, and testing the trained first object detection model with optimal evaluation result on a test set.

Preferably, the second object detection model includes YOLO.

Preferably, the evaluating the current first object detection model by using a validation set includes:

performing Mean Average Precision (MAP) evaluation on the current first object detection model by using the validation set;

the determining the optimal first object detection model according to the evaluation result including:

determining a first object detection model corresponding to a maximum MAP within the second preset number of times as the optimal first object detection model.

Preferably, the calculating an object detection task reward corresponding to the current first object detection model includes:

$$\text{reward} = \tan\left(\left(\alpha\frac{1}{L_{cla}} + (1-a)\frac{1}{L_{reg}} - \text{baseline}\right) * \frac{\pi}{2}\right),$$

$$\text{where } \left(\alpha\frac{1}{L_{cla}} + (1-a)\frac{1}{L_{reg}} - \text{baseline}\right) \in (-1, 1)$$

wherein $L_{cla}$ is classification loss, $L_{reg}$ is regression loss, and the baseline is a preset numerical value or formula.

Preferably, the adjusting parameters used for searching for the NAS network model according to the reward includes:

feeding the reward back to the RNN controller, and updating trainable parameters of the RNN controller by $\theta \leftarrow \theta + \gamma \nabla_\theta \log \pi_\theta(s_t, a_t) \cdot R_t$, wherein $\theta$ represents the trainable parameters of the RNN controller, $\gamma \nabla_\theta$ represents a back propagation gradient of the trainable parameter, $\gamma$ represents a preset parameter, $\log \pi_\theta(s_t, a_t)$ is a cross entropy loss corresponding to the NAS network model searched for when step S1 is performed for the t-th time, and $R_t$ represents a reward value corresponding to the NAS network model searched for when step S1 is performed for the t-th time.

To solve the above technical problems, embodiments of the present invention further provide an automatic modeling device for object detection model, which includes a memory and a processor;

the memory is configured for storing a program for automatic modeling of the object detection model; and the processor is configured for reading and performing the program for automatic modeling of the object detection model, and performing the following operations:

S1, searching for a Neural Architecture Search (NAS) network model according to a predetermined first neural network;

S2, training a first object detection model by using a training set, evaluating the current first object detection model by using a validation set after a number of training times reaches a first preset number of times, and outputting an evaluation result, wherein the first object detection model is a model obtained by detection part fusion of the NAS network model and a second object detection model;

S3, calculating an object detection task reward corresponding to the current first object detection model; and S4, adjusting parameters used for searching for the NAS network model according to the object detection task reward; and repeating the steps S1-S4 for a second preset number of times, and determining an optimal first object detection model according to the evaluation result.

Preferably, the first neural network is a Recurrent Neural Network (RNN),

Step S1 includes:

step S11, sampling through a RNN controller according to preconfigured hyperparameters, to obtain a subnetwork structure encoding; wherein said hyperparameters include subnetwork hyperparameters, controller hyperparameters; the subnetwork hyperparameters include the number of layers of the subnetwork, the number of cell branches, parameters related to the learning rate of the subnetwork, and the number of output channels; the controller hyperparameters include parameters related to the learning rate of the controller, and optimizer configuration parameters; and step S12: outputting the NAS network model by decoding the subnetwork structure encoding through a decoder.

Preferably, the NAS network model is a NAS network without a fully connected layer.

The detection part fusion of the NAS network and the first object detection model refers to:

that a plurality of output ends of different scales of the NAS network model are each connected to a 1*1 convolutional layer, and an output of the 1*1 convolutional layer is used as an input of a detection part of the second object detection model.

Preferably, the processor is configured for reading and performing the program for automatic modeling of the object detection model, and performing the following operations:

after determining the optimal first object detection model according to the evaluation result, training the first object detection model with optimal evaluation result by using a training set, and testing the trained first object detection model with optimal evaluation result on a test set.

Preferably, the second object detection model includes Yolo.

Preferably, the evaluating the current first object detection model by using a validation set includes:

performing Mean Average Precision (MAP) evaluation on the current first object detection model by using the validation set;

the determining the optimal first object detection model according to the evaluation result including:

determining a first object detection model corresponding to a maximum MAP within the second preset number of times as the optimal first object detection model.

Preferably, the calculating an object detection task reward corresponding to the current first object detection model includes:

$$\text{reward} = \tan\left(\left(\alpha\frac{1}{L_{cla}} + (1-a)\frac{1}{L_{reg}} - \text{baseline}\right) * \frac{\pi}{2}\right),$$

$$\text{where } \left(\alpha\frac{1}{L_{cla}} + (1-a)\frac{1}{L_{reg}} - \text{baseline}\right) \in (-1, 1)$$

wherein $L_{cla}$ is classification loss, $L_{reg}$ is regression loss, and the baseline is a preset numerical value or formula.

Preferably, the adjusting parameters used for searching for the NAS network model according to the reward includes:

feeding the reward back to the RNN controller, and updating trainable parameters of the RNN controller by $\theta \leftarrow \theta + \gamma \nabla_\theta \log \pi_\theta(s_t, a_t) \cdot R_t$, wherein $\theta$ represents the trainable parameters of the RNN controller, $\gamma \nabla_\theta$ represents a back propagation gradient of the trainable parameter, $\gamma$ represents a preset parameter, $\log \pi_\theta(s_t, a_t)$ is a cross entropy loss corresponding to the NAS network model searched for when step S1 is performed for the t-th time, and $R_t$ represents a reward value corresponding to the NAS network model searched for when step S1 is performed for the t-th time.

In summary, the embodiments of the present invention provide an automatic modeling method and device for object detection model, which improves the object detection effect by fusing the feature extraction model searched for according to different tasks with the object detection model in the prior art to form a new object detection model.

DETAILED DESCRIPTION OF THE INVENTION

To make the objects, technical solutions and advantages of the present invention more apparent, embodiments of the present invention will be described in detail below with reference to the accompanying drawings. It should be noted that the embodiments and features of the embodiments in the present application may be arbitrarily combined with each other without conflict.

Embodiment 1

Figure 1:
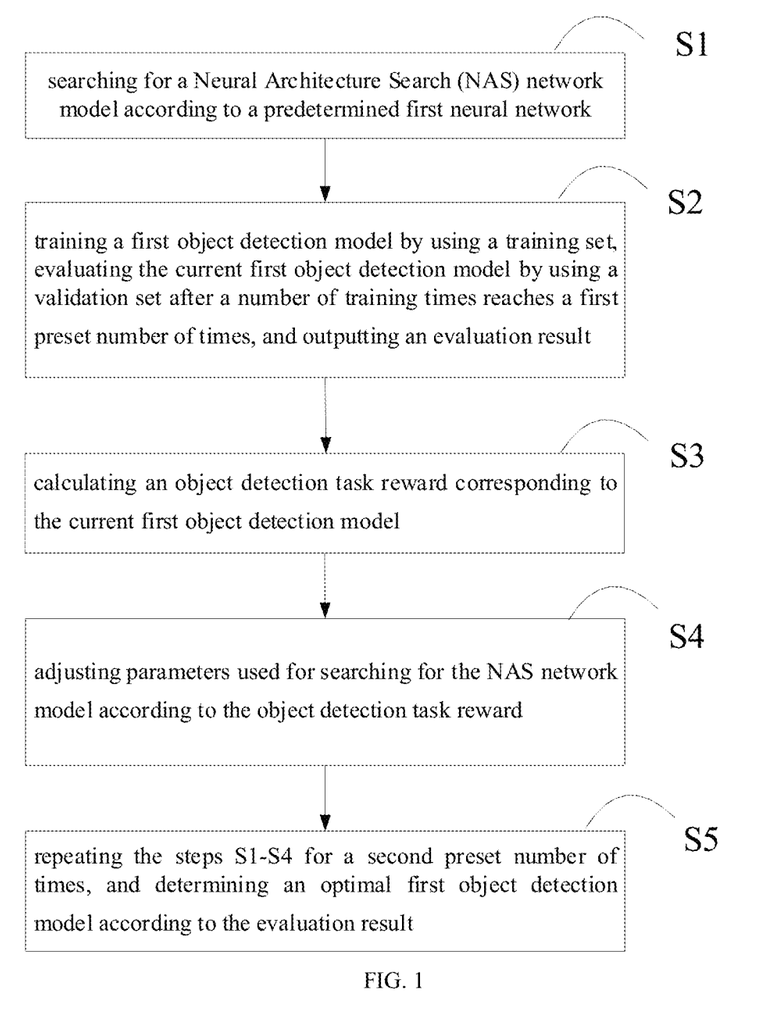
FIG. 1 is a schematic diagram of an automatic modeling method for object detection model according to an embodiment of the present invention.

FIG. 1 is a schematic diagram of an automatic modeling method for object detection model according to an embodiment of the present invention. As shown in FIG. 1, the automatic modeling method of the present embodiment includes:

S1, searching for an NAS network model according to a predetermined first neural network.

In an exemplary embodiment, the first neural network may be a recurrent neural network (RNN); the NAS network model refers to Neural Architecture Search network model.

Step S1 can include:

step S11, sampling through a RNN controller according to preconfigured hyperparameters, to obtain a subnetwork structure encoding; wherein said hyperparameters include subnetwork hyperparameters, controller hyperparameters; the subnetwork hyperparameters include the number of layers of the subnetwork, the number of cell branches, parameters related to the learning rate of the subnetwork, and the number of output channels; the controller hyperparameters include parameters related to the learning rate of the controller, and optimizer configuration parameters;

step S12: outputting the NAS network model by decoding the subnetwork structure encoding through a decoder.

S2, training a first object detection model by using a training set, evaluating the current first object detection model by using a validation set after a number of training times reaches a first preset umber of times, and outputting an evaluation result, wherein the first object detection model is a model obtained by detection part fusion of the NAS network model and a second object detection model.

In an exemplary embodiment, the NAS network model is a NAS network without a fully connected layer.

In an exemplary embodiment, the detection part fusion of the NAS network and the first object detection model refers to:

that a plurality of output ends of different scales of the NAS network model are each connected to a 1*1 convolutional layer, and an output of the 1*1 convolutional layer is used as an input of a detection part of the second object detection model.

In an exemplary embodiment, the evaluating the current first object detection model by using a validation set can include:

performing Mean Average Precision (MAP) evaluation on the current first object detection model by using the validation set;

wherein, the second object detection model can include Yolo. Yolo (You Only Live Once) is a deep neural network based object recognition and positioning algorithm. It is a one-stage algorithm, i.e., it applies the algorithm directly to the input image and outputs the category and the corresponding positioning.

In an exemplary embodiment, the determining the optimal first object detection model according to the evaluation result can include:

determining a first object detection model corresponding to a maximum MAP within the second preset number of times as the optimal first object detection model.

S3, calculating an object detection task reward corresponding to the current first object detection model.

In an exemplary embodiment, the calculating an object detection task reward corresponding to the current first object detection model includes:

$$\text{reward} = \tan\left(\left(\alpha\frac{1}{L_{cla}} + (1-a)\frac{1}{L_{reg}} - \text{baseline}\right) * \frac{\pi}{2}\right),$$

$$\text{where } \left(\alpha\frac{1}{L_{cla}} + (1-a)\frac{1}{L_{reg}} - \text{baseline}\right) \in (-1, 1)$$

wherein $L_{cla}$ is classification loss, $L_{reg}$ is regression loss, and the baseline is a preset numerical value or formula.

S4, adjusting parameters used for searching for the NAS network model according to the object detection task reward; and In an exemplary embodiment, the adjusting parameters used for searching for the NAS network model according to the reward includes:

feeding the reward back to the RNN controller, and updating trainable parameters of the RNN controller by $\theta \leftarrow \theta + \gamma \nabla_\theta \log \pi_\theta(s_t, a_t) \cdot R_t$, wherein $\theta$ represents the trainable parameters of the RNN controller, $\gamma \nabla_\theta$ represents a back propagation gradient of the trainable parameter, $\gamma$ represents a preset parameter, $\log \pi_\theta(s_t, a_t)$ is a cross entropy loss corresponding to the NAS network model searched for when step S1 is performed for the t-th time, and $R_t$ represents a reward value corresponding to the NAS network model searched for when step S1 is performed for the t-th time.

Wherein the parameters used by the NAS network model may include the trainable parameters of the RNN controller.

S5, repeating the steps S1-S4 for a second preset number of times, and determining an optimal first object detection model according to the evaluation result.

In an exemplary embodiment, the determining the optimal first object detection model according to the evaluation result can include:

determining a first object detection model corresponding to a maximum MAP within the second preset number of times as the optimal first object detection model.

In an exemplary embodiment, after determining the optimal first object detection model according to the evaluation result, the method can include:

training the first object detection model with optimal evaluation result by using a training set, and testing the trained first object detection model with optimal evaluation result on a test set.

Embodiment 2

Figure 2:
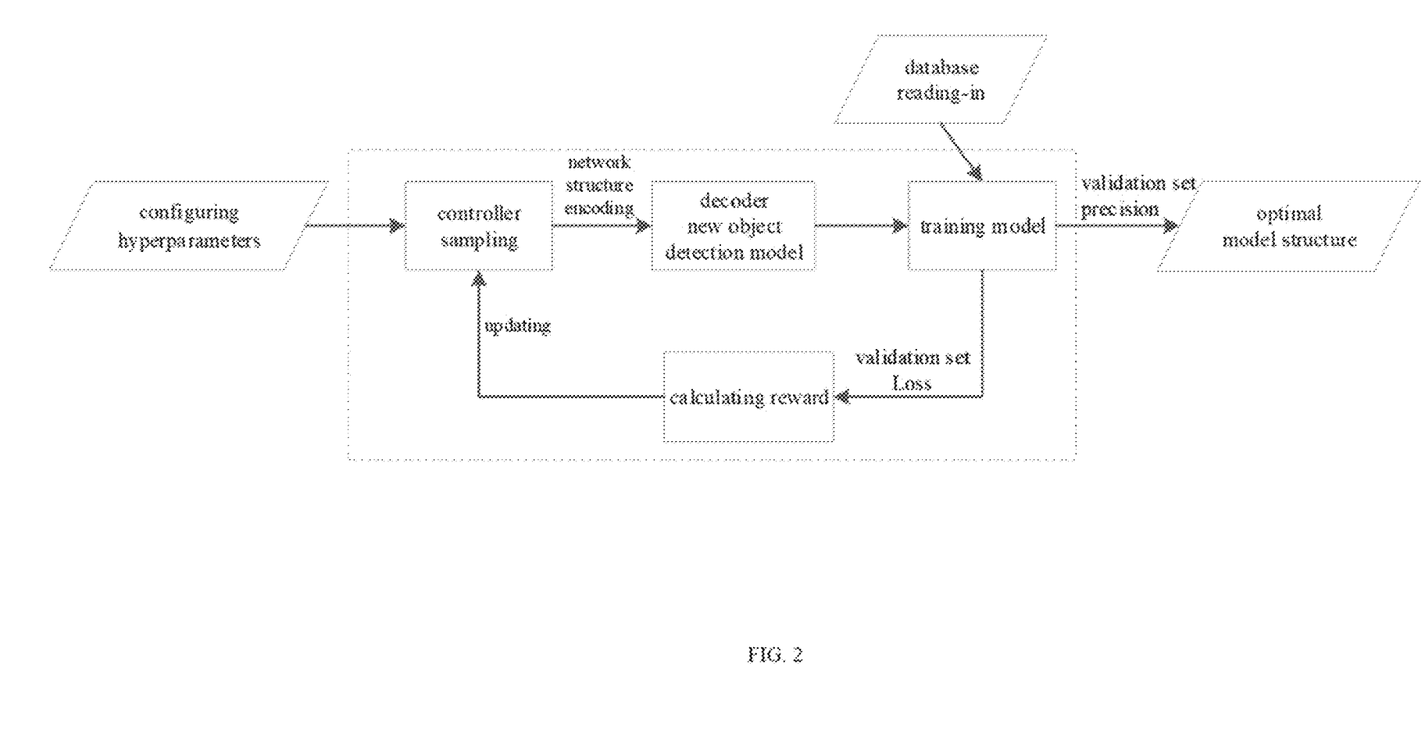
FIG. 2 is a flow chart of automatic modeling for object detection model according to an embodiment of the present invention.

FIG. 2 is a schematic diagram of an automatic modeling method for object detection model according to an embodiment of the present invention. As shown in FIG. 2, the method includes the following steps:

Step 201: initializing input.

The initializing input includes configuring the hyperparameters and database reading-in data sets. The hyperparameters may include subnetwork hyperparameters and controller hyperparameters. The subnetwork hyperparameters mainly include the number of layers of the subnetwork, the number of cell branches, model learning rate related parameters, the number of output channels, etc. The number of layers of the subnetwork is the number of cells, and the parameters related to the learning rate of the subnetwork refer to, for example, the decay rate, decay step etc., in exponential decay. The above data sets may include training set, validation set and test set.

Step 202: adopting the RNN network as the controller to sample and output the subnetwork structure encoding.

Step 203: outputting the NAS network model through a decoder, and fusing it with the output part of Yolo3 to form a Yolo3-NAS model.

Figure 3:
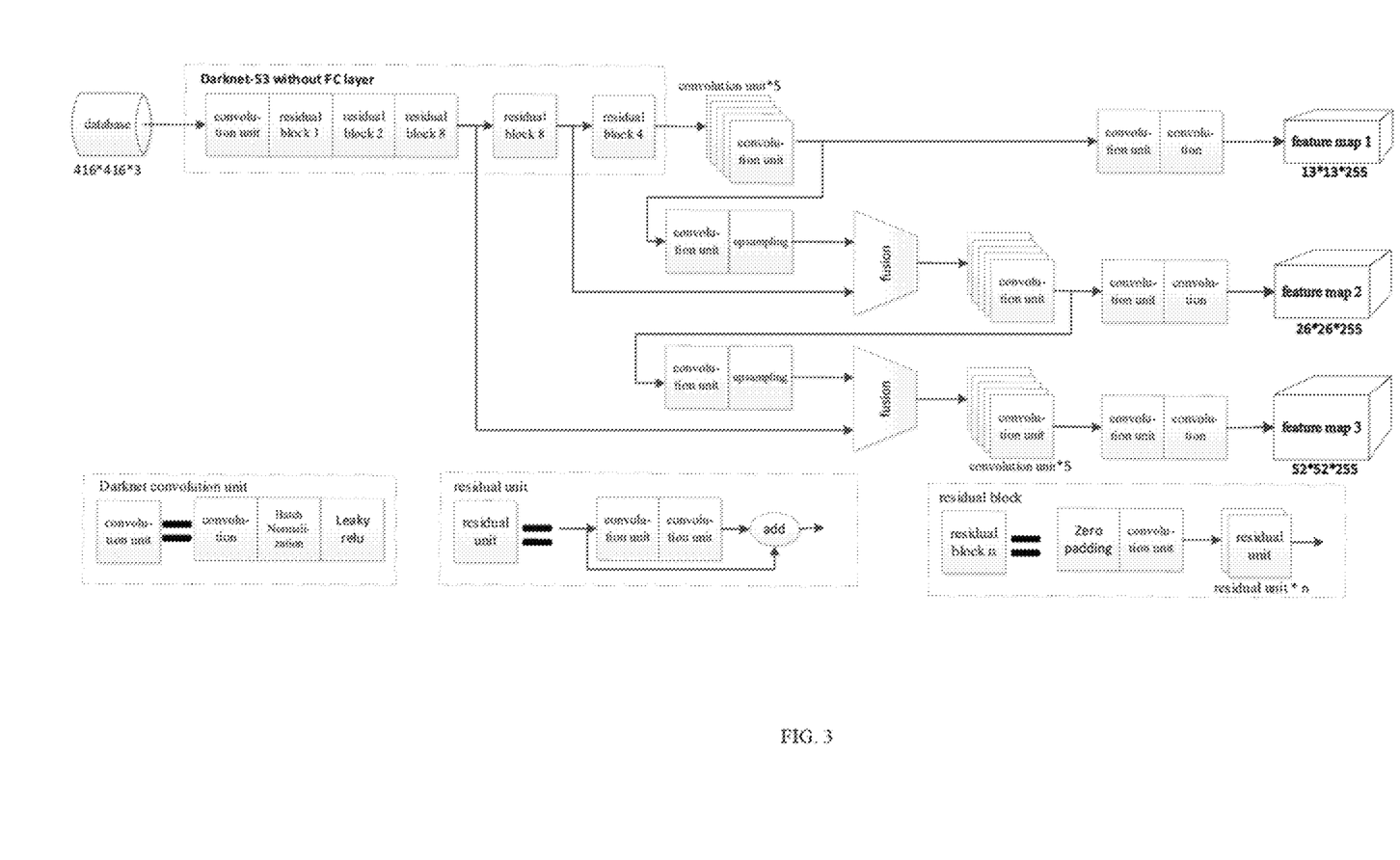
FIG. 3 is a schematic diagram of Yolo3 according to an embodiment of the present invention.

As shown in FIG. 3, the current Yolo3 adopts the network structure of Darknet-53 to extract image features, and in the detection part, the idea of FPN (feature pyramid networks) is referred.

Figure 4:
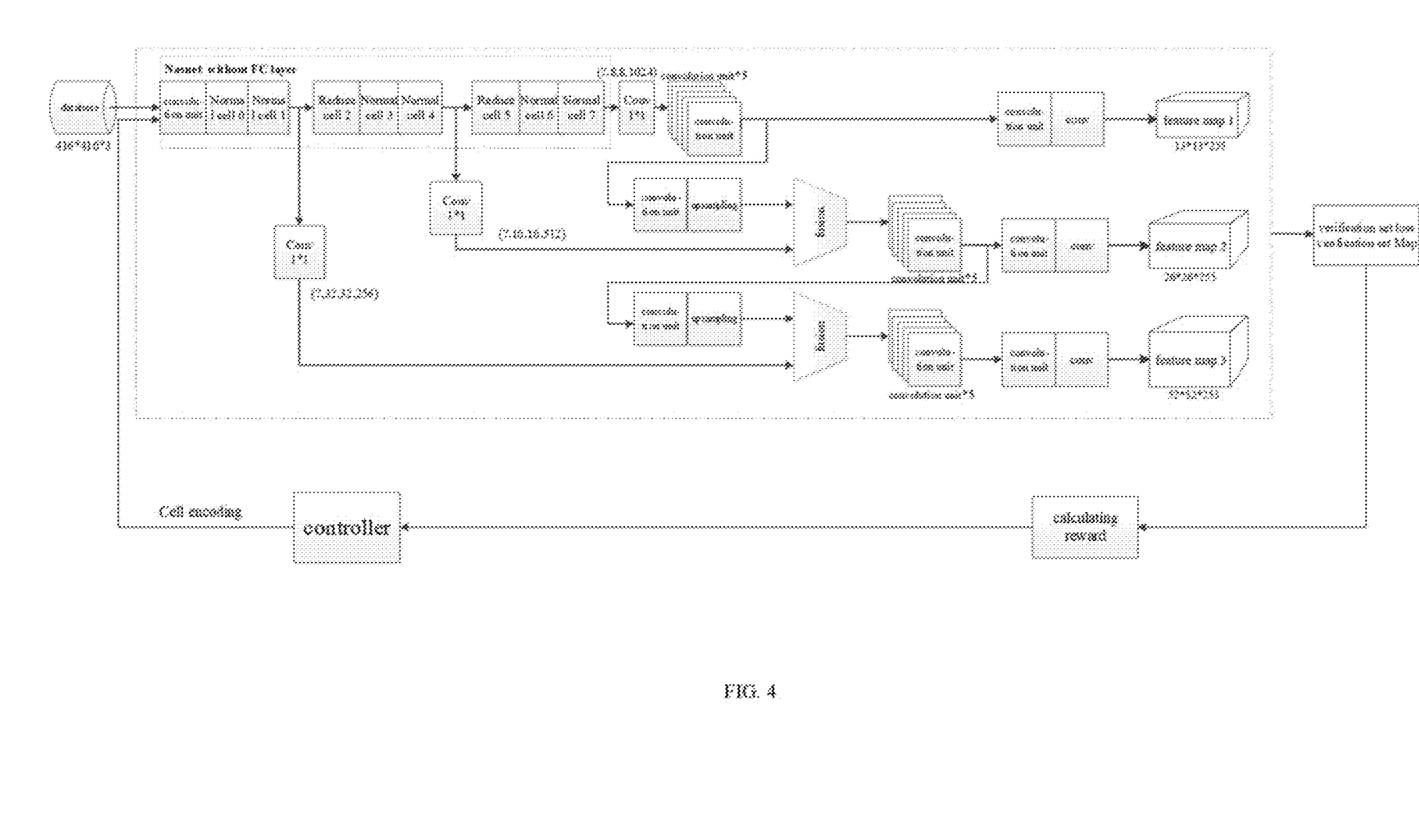
FIG. 4 is a schematic diagram of automatic modeling of Yolo3-NAS model according to an embodiment of the present invention.

As shown in FIG. 4, the present invention replaces the feature extraction network Darknet-53 in Yolo3 with the NAS network generated by automatic search (normal cell and reduce cell superimposed), and fuses it with the detection output part of Yolo by removing the fully connected layer of the NAS network model and adding 1*1 convolution to a plurality of output ends of the NAS network model to form Yolo3-NAS model. It should be noted that the present embodiment is described based on Yolo3, but it is not limited to Yolo3 in practical applications, and other object detection models may also be improved in this manner.

Step 204: after training the Yolo3-NAS model on a training set and reaching a preset number of training times, validating the Yolo3-NAS model through a validation set, and outputting an evaluation result.

Wherein, the evaluation result may be evaluated with mean average precision (MAP). The MAP evaluation is a prior art and will not be described herein again.

Step 205: calculating the object detection task reward corresponding to the Yolo3-NAS model.

Wherein, the reward is calculated by the formula below:

$$\text{reward} = \tan\left(\left(\alpha\frac{1}{L_{cla}} + (1-a)\frac{1}{L_{reg}} - \text{baseline}\right) * \frac{\pi}{2}\right),$$

$$\text{where } \left(\alpha\frac{1}{L_{cla}} + (1-a)\frac{1}{L_{reg}} - \text{baseline}\right) \in (-1, 1)$$

wherein $L_{cla}$ is classification loss, $L_{reg}$ is regression loss, and the baseline is a preset numerical value or formula. The object detection includes two parts: classification and regression. Classification is whether the object category is correctly classified in the object detection, and regression is whether the position of the object is correct. The corresponding loss of classification and regression is the classification loss and regression loss. Meanwhile, the present invention expands the excitation effect by the function (from (−1,1) expanding to (−∞, ∞)), which makes the controller parameters update faster, i.e., search for the optimal model structure faster.

Step 206: feeding the reward back to the controller and updating the trainable parameters of the controller.

Wherein, the formula for updating the controller parameters is $\theta \leftarrow \theta + \gamma \nabla_\theta \log \pi_\theta(s_t, a_t) \cdot R_t$.

Wherein, θ represents the trainable parameters of the RNN controller, $\gamma \nabla_\theta$ represents a hack propagation gradient of the trainable parameters, γ represents a preset parameter, $\log \pi_\theta(s_t, a_t)$ is a cross entropy loss corresponding to the t-th structure (the NAS network model searched for when step S1 is performed for the t-th time). To ensure that this structure is really "correct", our loss is multiplied by $R_t$ (the reward value corresponding to the t-th structure (the NAS network model searched for when step S1 is performed for the t-th time)), and the reward is used to feed back whether the gradient calculated by this cross entropy is a trustworthy gradient. If the reward is small or negative, it indicates that the gradient descent is in a wrong direction and the parameters should be updated in another direction. If the reward is positive, or very large, it indicates that the gradient descent is in a correct direction, and the parameters are updated in that direction.

Step 207: repeating the above steps 202-206 for a preset number of times, and the maximum evaluation result for the preset number of times is used as the optimal subnetwork model searched for (i.e., the model obtained by detection part fusion of the NAS network model and a second object detection model), and retraining and testing the final effect on the test set.

By changing the object detection into automatic searching for optimal model approach, the invention can search for different models according to different tasks, thus improving the detection effect in a targeted manner.

Figure 5:
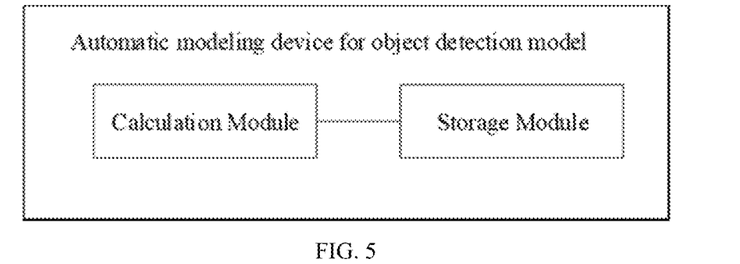
FIG. 5 is a schematic diagram of an automatic modeling device for object detection model according to an embodiment of the present invention.

FIG. 5 is a schematic diagram of an automatic modeling device for object detection model according to an embodiment of the present invention. As shown in FIG. 5, the automatic modeling device of the present embodiment includes a memory and a processor;

the memory is configured for storing a program for automatic modeling of the object detection model; and the processor is configured for reading and performing the program for automatic modeling of the object detection model, and performing the following operations:

S1, searching for a Neural Architecture Search (NAS) network model according to a predetermined first neural network;

S2, training a first object detection model by using a training set, evaluating the current first object detection model by using a validation set after a number of training times reaches a first preset number of times, and outputting an evaluation result, wherein the first object detection model is a model obtained by detection part fusion of the NAS network model and a second object detection model.

S3, calculating an object detection ask reward corresponding to the current first object detection model; and S4, adjusting parameters used for searching for the NAS network model according to the object detection task reward; and repeating the steps S1-S4 for a second preset number of times, and determining an optimal first object detection model according to the evaluation result.

Optionally, the first neural network is a Recurrent Neural Network (RNN).

Optionally, step S1 includes:

step S11, sampling through a RNN controller according to preconfigured hyperparameters, to obtain a subnetwork structure encoding; wherein said hyperparameters include subnetwork hyperparameters, controller hyperparameters; the subnetwork hyperparameters include the number of layers of the subnetwork, the number of cell branches, parameters related to the learning rate of the subnetwork, and the number of output channels; the controller hyperparameters include parameters related to the learning rate of the controller, and optimizer configuration parameters;

step S12: outputting the NAS network model by decoding the subnetwork structure encoding through a decoder.

Optionally, the NAS network model is a NAS network without a fully connected layer.

Optionally, the detection part fusion of the NAS network and the first object detection model refers to:

that a plurality of output ends of different scales of the NAS network model are each connected to a 1*1 convolutional layer, and an output of the 1*1 convolutional layer is used as an input of a detection part of the second object detection model.

Optionally, the processor is configured for reading and performing the program for automatic modeling of the object detection model, and performing the following operations:

after determining the optimal first object detection model according to the evaluation result, training the first object detection model with optimal evaluation result by using a training set, and testing the trained first object detection model with optimal evaluation result on a test set.

Optionally, the second object detection model includes Yolo.

Optionally, the evaluating the current first object detection model by using a validation set includes:

performing Mean Average Precision (MAP) evaluation on the current first object detection model by using the validation set;

Optionally, the determining the optimal first object detection model according to the evaluation result includes:

determining a first object detection model corresponding to a maximum MAP within the second preset number of times as the optimal first object detection model.

Optionally, the calculating an object detection task reward corresponding to the current first object detection model includes:

$$\text{reward} = \tan\left(\left(\alpha\frac{1}{L_{cla}} + (1-a)\frac{1}{L_{reg}} - \text{baseline}\right) * \frac{\pi}{2}\right),$$

$$\text{where } \left(\alpha\frac{1}{L_{cla}} + (1-a)\frac{1}{L_{reg}} - \text{baseline}\right) \in (-1, 1)$$

wherein $L_{cla}$ is classification loss, $L_{reg}$ is regression loss, and the baseline is a preset numerical value or formula.

Optionally, the adjusting parameters used for searching for the NAS network model according to the reward includes:

feeding the reward back to the RNN controller, and updating trainable parameters of the RNN controller by $\theta \leftarrow \theta + \gamma \nabla_\theta \log \pi_\theta(s_t, a_t) \cdot R_t$, wherein $\theta$ represents the trainable parameters of the RNN controller, $\gamma \nabla_\theta$ represents a back propagation gradient of the trainable parameter, $\gamma$ represents a preset parameter, $\log \pi_\theta(s_e, a_t)$ is a cross entropy loss corresponding to the NAS network model searched for when step S1 is performed for the t-th time, and $R_t$ represents a reward value corresponding to the NAS network model searched for when step S1 is performed for the t-th time.

A person of ordinary skill in the art can understand that all or some of the steps in the above method can be accomplished by instructing the relevant hardware by means of a program, and the program can be stored in a computer readable storage medium, such as a read-only memory, a magnetic disk or an optical disk, etc. Optionally, all or some of the steps of the above embodiments may also be implemented using one or more integrated circuits. Accordingly, the modules/units in the above embodiments may be implemented in the form of hardware or in the form of software function modules. The present invention is not limited to any particular form of combination of hardware and software.

Of course, the present invention may also have other various embodiments, and those skilled in the art can make various corresponding changes and modifications according to the present invention without departing from the spirit and essence of the present invention, but these corresponding changes and modifications shall fall within the scope of protection of the appended claims of the present invention.

What is claimed is:

1. An automatic modeling method for object detection model, comprising the following steps:

S1, searching for a Neural Architecture Search (NAS) network model according to a predetermined first neural network;

S2, training a first object detection model by using a training set, evaluating a current first object detection model by using a validation set after a number of training times reaches a first preset number of times, and outputting an evaluation result, wherein the first object detection model is a model obtained by detection part fusion of the NAS network model and a second object detection model;

S3, calculating an object detection task reward corresponding to the current first object detection model;

S4, adjusting parameters used for searching for the NAS network model according to the object detection task reward; and repeating the steps S1-S4 for a second preset number of times, and determining an optimal first object detection model according to the evaluation result;

wherein the NAS network model is a NAS network without a fully connected layer; the detection part fusion of the NAS network model and the second object detection model refers to: that a plurality of output ends of different scales of the NAS network model are each connected to a 1*1 convolutional layer, and an output of the 1*1 convolutional layer is used as an input of a detection part of the second object detection model.

2. The method according to claim 1, wherein, the predetermined first neural network is a recurrent neural network (RNN); and the step S1 comprises:

step S11, sampling through an RNN controller according to preconfigured hyperparameters, to obtain a subnetwork structure encoding; wherein said preconfigured hyperparameters include subnetwork hyperparameters and controller hyperparameters; the subnetwork hyperparameters include a number of layers of a subnetwork, a number of cell branches, parameters related to a learning rate of the subnetwork, and a number of output channels; the controller hyperparameters include parameters related to a learning rate of the RNN controller and optimizer configuration parameters; and step S12: outputting the NAS network model by decoding the subnetwork structure encoding through a decoder.

3. The method according to claim 2, wherein, the adjusting parameters used for searching for the NAS network model according to the object detection task reward comprises:

feeding the object detection task reward back to the RNN controller, and updating trainable parameters of the RNN controller by $\theta \leftarrow \theta + \gamma \nabla_\theta \log \pi_\theta(s_t, a_t) \cdot R_t$, wherein $\theta$ represents the trainable parameters of the RNN controller, $\gamma \nabla_\theta$ represents a back propagation gradient of the trainable parameter, $\gamma$ represents a preset parameter, $\log \pi_\theta(s_t, a_t)$ is a cross entropy loss corresponding to the NAS network model searched for when step S1 is performed for a t-th time, and $R_t$ represents a reward value corresponding to the NAS network model searched for when step S1 is performed for the t-th time.

4. The method according to claim 1, wherein after determining the optimal first object detection model according to the evaluation result, the method comprises:
training the first object detection model with optimal evaluation result by using a training set, and testing the trained first object detection model with optimal evaluation result on a test set.

5. The method according to claim 1, wherein, the second object detection model includes you only look once (Yolo).

6. The method according to claim 1, wherein, the evaluating a current first object detection model by using a validation set comprises:
performing Mean Average Precision (MAP) evaluation on the current first object detection model by using the validation set;
the determining an optimal first object detection model according to the evaluation result comprises:
determining a first object detection model corresponding to a maximum MAP within the second preset number of times as the optimal first object detection model.

7. The method according to claim 1, wherein the calculating an object detection task reward corresponding to the current first object detection model comprises:

$$\text{reward} = \tan\left(\left(\alpha \frac{1}{L_{cla}} + (1-a)\frac{1}{L_{reg}} - \text{baseline}\right) * \frac{\pi}{2}\right),$$

$$\text{where } \left(\alpha \frac{1}{L_{cla}} + (1-a)\frac{1}{L_{reg}} - \text{baseline}\right) \in (-1, 1)$$

wherein $L_{cla}$ is classification loss, $L_{reg}$ is regression loss, and the baseline is a preset numerical value or formula.

8. An automatic modeling device for object detection model, comprising a memory and a processor, wherein,
the memory is configured for storing a program for automatic modeling of the object detection model; and
the processor is configured for reading and performing the program for automatic modeling of the object detection model, and performing the following operations:
S1, searching for a Neural Architecture Search (NAS) network model according to a predetermined first neural network;
S2, training a first object detection model by using a training set, evaluating a current first object detection model by using a validation set after a number of training times reaches a first preset number of times, and outputting an evaluation result, wherein the first object detection model is a model obtained by detection part fusion of the NAS network model and a second object detection model;
S3, calculating an object detection task reward corresponding to the current first object detection model;
S4, adjusting parameters used for searching for the NAS network model according to the object detection task reward; and
repeating the steps S1-S4 for a second preset number of times, and determining an optimal first object detection model according to the evaluation result;
wherein the NAS network model is a NAS network without a fully connected layer; the detection part fusion of the NAS network model and the second object detection model refers to: that a plurality of output ends of different scales of the NAS network model are each connected to a 1*1 convolutional layer, and an output of the 1*1 convolutional layer is used as an input of a detection part of the second object detection model.

9. The device according to claim 8, wherein,
the predetermined first neural network is a recurrent neural network (RNN); and
the step S1 comprises:
step S11, sampling through an RNN controller according to preconfigured hyperparameters, to obtain a subnetwork structure encoding; wherein said preconfigured hyperparameters include subnetwork hyperparameters and controller hyperparameters; the subnetwork hyperparameters include a number of layers of a subnetwork, a number of cell branches, parameters related to a learning rate of the subnetwork, and a number of output channels; the controller hyperparameters include parameters related to a learning rate of the RNN controller and optimizer configuration parameters; and
step S12: outputting the NAS network model by decoding the subnetwork structure encoding through a decoder.

10. The device according to claim 9, wherein,
the adjusting parameters used for searching for the NAS network model according to the object detection task reward comprises:
feeding the object detection task reward back to the RNN controller, and
updating trainable parameters of the RNN controller by $\theta \leftarrow \theta + \gamma \nabla_\theta \log \pi_\theta(s_t, a_t) \cdot R_t$, wherein $\theta$ represents the trainable parameters of the RNN controller, $\gamma \nabla_\theta$ represents a back propagation gradient of the trainable parameter, $\gamma$ represents a preset parameter, $\log \pi_\theta(s_t, a_t)$ is a cross entropy loss corresponding to the NAS network model searched for when step S1 is performed for a t-th time, and $R_t$ represents a reward value corresponding to the NAS network model searched for when step S1 is performed for the t-th time.

11. The device according to claim 8, wherein the processor is configured for reading and performing the program for automatic modeling of the object detection model, and performing the following operations:
after determining the optimal first object detection model according to the evaluation result, training the first object detection model with optimal evaluation result by using a training set, and testing the trained first object detection model with optimal evaluation result on a test set.

12. The device according to claim 8, wherein, the second object detection model includes you only look once (Yolo).

13. The device according to claim 8, wherein, the evaluating a current first object detection model by using a validation set comprises:
performing Mean Average Precision (MAP) evaluation on the current first object detection model by using the validation set;
the determining an optimal first object detection model according to the evaluation result comprises:
determining a first object detection model corresponding to a maximum MAP within the second preset number of times as the optimal first object detection model.

14. The device according to claim 8, wherein the calculating an object detection task reward corresponding to the current first object detection model comprises:

$$\text{reward} = \tan\left(\left(\alpha \frac{1}{L_{cla}} + (1-a)\frac{1}{L_{reg}} - \text{baseline}\right) * \frac{\pi}{2}\right),$$

$$\text{where } \left(\alpha \frac{1}{L_{cla}} + (1-a)\frac{1}{L_{reg}} - \text{baseline}\right) \in (-1, 1)$$

wherein $L_{cla}$ is classification loss, $L_{reg}$ is regression loss, and the baseline is a preset numerical value or formula.

\* \* \* \* \*